United States Patent
Park et al.

(10) Patent No.: US 9,838,899 B2
(45) Date of Patent: Dec. 5, 2017

(54) METHOD AND APPARATUS FOR REPORTING DOWNLINK CHANNEL STATE

(71) Applicant: LG ELECTRONICS INC., Seoul (KR)

(72) Inventors: Hanjun Park, Seoul (KR); Hyungtae Kim, Seoul (KR); Jonghyun Park, Seoul (KR); Kijun Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 14/766,718

(22) PCT Filed: Feb. 7, 2014

(86) PCT No.: PCT/KR2014/001056
§ 371 (c)(1),
(2) Date: Aug. 7, 2015

(87) PCT Pub. No.: WO2014/123386
PCT Pub. Date: Aug. 14, 2014

(65) Prior Publication Data
US 2015/0382222 A1      Dec. 31, 2015

Related U.S. Application Data

(60) Provisional application No. 61/762,327, filed on Feb. 8, 2013.

(51) Int. Cl.
*H04W 24/10*      (2009.01)
*H04L 1/00*      (2006.01)
(Continued)

(52) U.S. Cl.
CPC .......... *H04W 24/10* (2013.01); *H04B 7/0626* (2013.01); *H04B 7/0639* (2013.01);
(Continued)

(58) Field of Classification Search
None
See application file for complete search history.

(56) References Cited

U.S. PATENT DOCUMENTS

2012/0113844 A1      5/2012  Krishnamurthy
2013/0088986 A1*     4/2013  Xiao ................. H04W 72/0426
                                                            370/252
(Continued)

FOREIGN PATENT DOCUMENTS

WO      2011/013986      2/2011
WO      2011/130401      10/2011
(Continued)

OTHER PUBLICATIONS

PCT International Application No. PCT/KR2014/001056, Written Opinion of the International Searching Authority dated May 26, 2014, 9 pages.

*Primary Examiner* — Steven H Nguyen
(74) *Attorney, Agent, or Firm* — Lee Hong Degerman Kang Waimey

(57) ABSTRACT

A method and apparatus for reporting a downlink channel state are disclosed. The method for reporting channel state information (CSI) to a base station (BS) by a user equipment (UE) in a wireless communication system having frequency-selective inter-cell interference, includes: performing channel measurement in a frequency band configured for downlink channel measurement; and reporting downlink channel state information (CSI) in accordance with the downlink channel measurement, wherein the frequency band is independently configured for each information contained in the CSI, and thus the downlink channel measurement is performed in each information-specifically configured frequency band contained in the CSI. As a result, the method and apparatus can efficiently report downlink channel state (Continued)

information, such that a higher-quality communication environment is expected in a heterogeneous cell environment.

9 Claims, 9 Drawing Sheets

(51) Int. Cl.
  *H04J 11/00* (2006.01)
  *H04L 5/00* (2006.01)
  *H04B 7/06* (2006.01)
  *H04W 24/08* (2009.01)
  *H04W 74/00* (2009.01)
  *H04W 72/12* (2009.01)

(52) U.S. Cl.
  CPC .............. *H04J 11/005* (2013.01); *H04L 1/00* (2013.01); *H04L 5/0057* (2013.01); *H04W 24/08* (2013.01); *H04W 74/006* (2013.01); *H04W 72/1226* (2013.01)

(56) References Cited

U.S. PATENT DOCUMENTS

| 2013/0156009 | A1* | 6/2013 | Dinan | H04B 7/0456 370/332 |
| 2013/0196675 | A1* | 8/2013 | Xiao | H04W 72/082 455/452.1 |
| 2014/0044033 | A1* | 2/2014 | Molteni | H04W 52/241 370/311 |
| 2014/0161093 | A1* | 6/2014 | Hoshino | H04B 7/024 370/329 |
| 2015/0189531 | A1* | 7/2015 | Seo | H04J 11/005 370/252 |
| 2015/0382371 | A1* | 12/2015 | Liu | H04B 7/024 370/329 |

FOREIGN PATENT DOCUMENTS

| WO | 2011/134174 | 11/2011 |
| WO | 2011/162522 | 12/2011 |

\* cited by examiner

FIG. 7
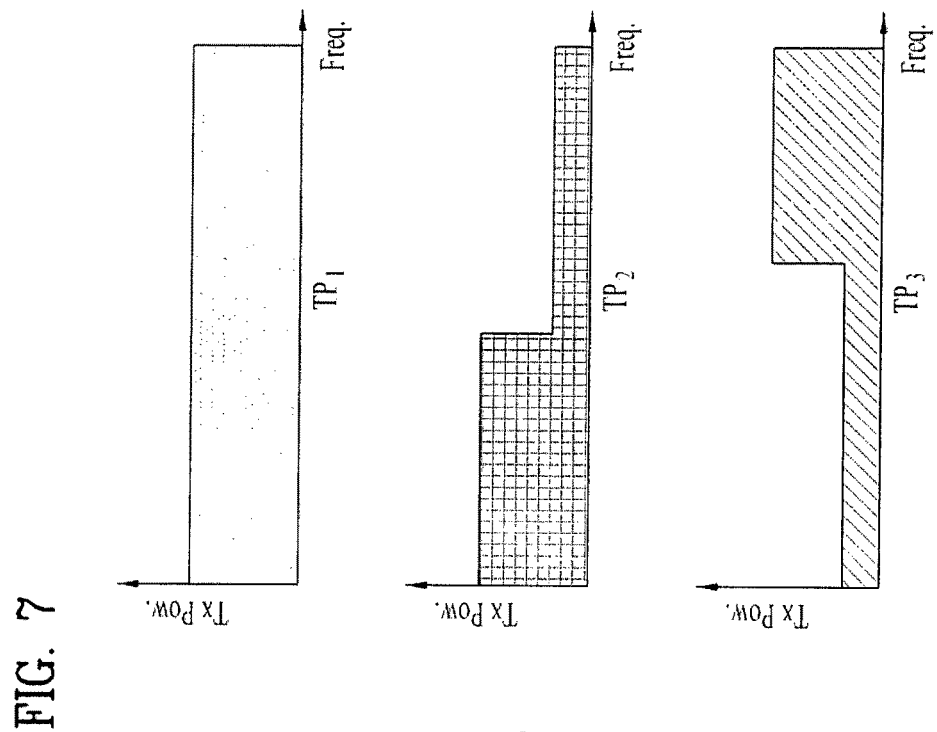
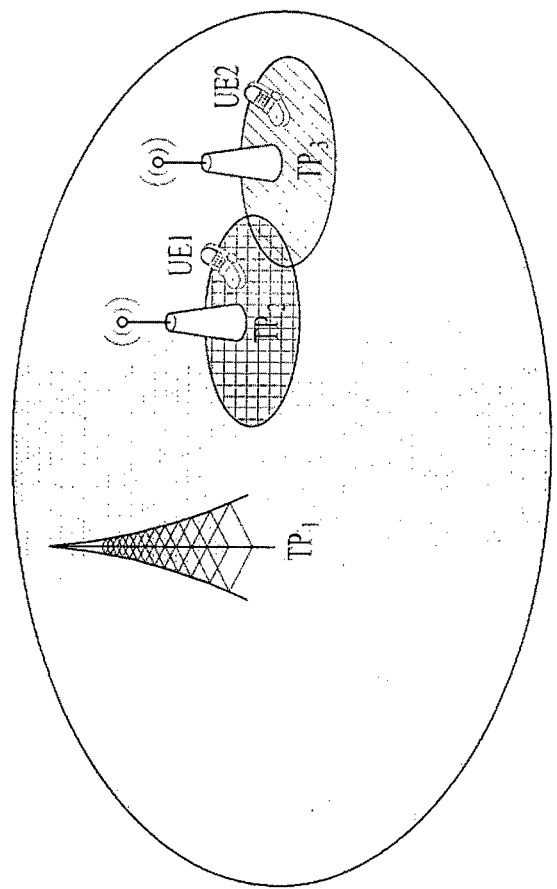

METHOD AND APPARATUS FOR REPORTING DOWNLINK CHANNEL STATE

CROSS-REFERENCE TO RELATED APPLICATIONS

This application is the National Stage filing under 35 U.S.C. 371 of International Application No. PCT/KR2014/001056, filed on Feb. 7, 2014, which claims the benefit of U.S. Provisional Application No. 61/762,327, filed on Feb. 8, 2013, the contents of which are all hereby incorporated by reference herein in their entirety.

TECHNICAL FIELD

The present invention relates to a wireless communication system, and more particularly to a method and apparatus for reporting a downlink channel state when frequency selective inter-cell interference occurs.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for efficiently reporting a downlink channel state.

It will be appreciated by persons skilled in the art that the effects that can be achieved through the present invention are not limited to what has been particularly described hereinabove and other advantages of the present invention will be more clearly understood from the following detailed description.

Technical Solution

The objects of the present invention can be achieved by providing a method for reporting channel state information (CSI) to a base station (BS) by a user equipment (UE) in a wireless communication system including frequency-selective inter-cell interference. The method includes: performing channel measurement in a frequency band configured for downlink channel measurement; and reporting downlink channel state information (CSI) in accordance with the downlink channel measurement, wherein the frequency band is independently configured for each information contained in the CSI, and thus the downlink channel measurement is performed in each information-specifically configured frequency band contained in the CSI.

Preferably, the frequency band may be set to a frequency band (hereinafter referred to as a first frequency band) for first information/second information of the CSI, and may be set to a frequency band (hereinafter referred to as a second frequency band) for third information, wherein the second frequency band is a subset of the first frequency band.

Preferably, the second frequency band may exclude a frequency band in which the amount of interference is equal to or higher than a threshold value from the first frequency band.

Preferably, the first information may be a rank indicator (RI), the second information may be a channel quality indicator (CQI), and the third information may be a precoding matrix indicator (PMI).

Preferably, the configuration of the frequency band may be signaled from the base station (BS), or may be directly decided by the user equipment (UE).

Preferably, each information contained in the CSI for a frequency band from which each information-specifically configured frequency band contained in the CSI is excluded from among the frequency band may be obtained by a pre-configured channel interpolation method.

Preferably, the channel measurement may be performed on a sub-band basis, at least two sub-bands may be integrated into one sub-band within the frequency band, and the integrated sub-band may be indicated by bitmap information.

Preferably, the channel measurement may be performed on a sub-band basis, at least one sub-band may be sub-divided into at least two sub-bands within the frequency band, and specific information indicating the sub-band to be sub-divided and the number of sub-divisions of the indicated sub-band may be indicated by bitmap information.

Preferably, the sub-division of the sub-band may be performed only for sub-band(s) in which a frequency selective inter-cell interference amount is higher than a threshold value.

In accordance with another aspect of the present invention, a user equipment (UE) for reporting a channel state to a base station (BS) in a wireless communication system including frequency-selective inter-cell interference includes: a radio frequency (RF) unit; and a processor configured to control the RF unit, wherein the processor performs channel measurement in a frequency band configured for downlink channel measurement, and reports downlink channel state information (CSI) in accordance with the downlink channel measurement, wherein the frequency band is independently configured for each information contained in the CSI, and thus the processor is configured to perform the downlink channel measurement in association with each information-specifically configured frequency band contained in the CSI.

The above description corresponds to part of embodiments of the present invention and various embodiments reflecting technical characteristics of the present invention are derived and understood by those skilled in the art on the basis of the following detailed description of the present invention.

Advantageous Effects

As is apparent from the above description, exemplary embodiments of the present invention can efficiently report downlink channel state information, such that a higher-quality communication environment can be expected in a heterogeneous cell environment.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram illustrating a wireless communication system where frequency-selective intercell interferences are exist according to an embodiment of the present application;

BEST MODE

Figure 1:
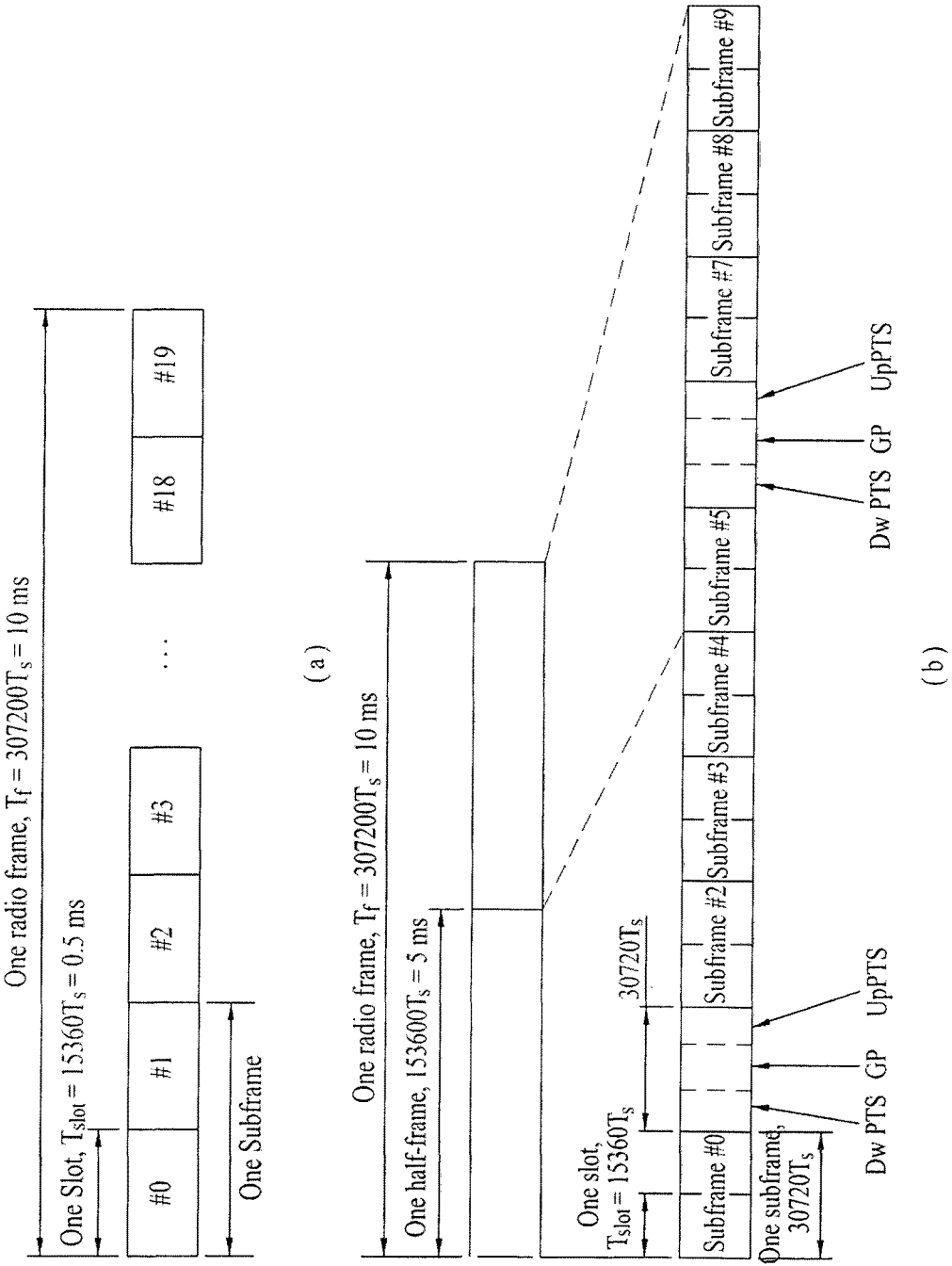
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
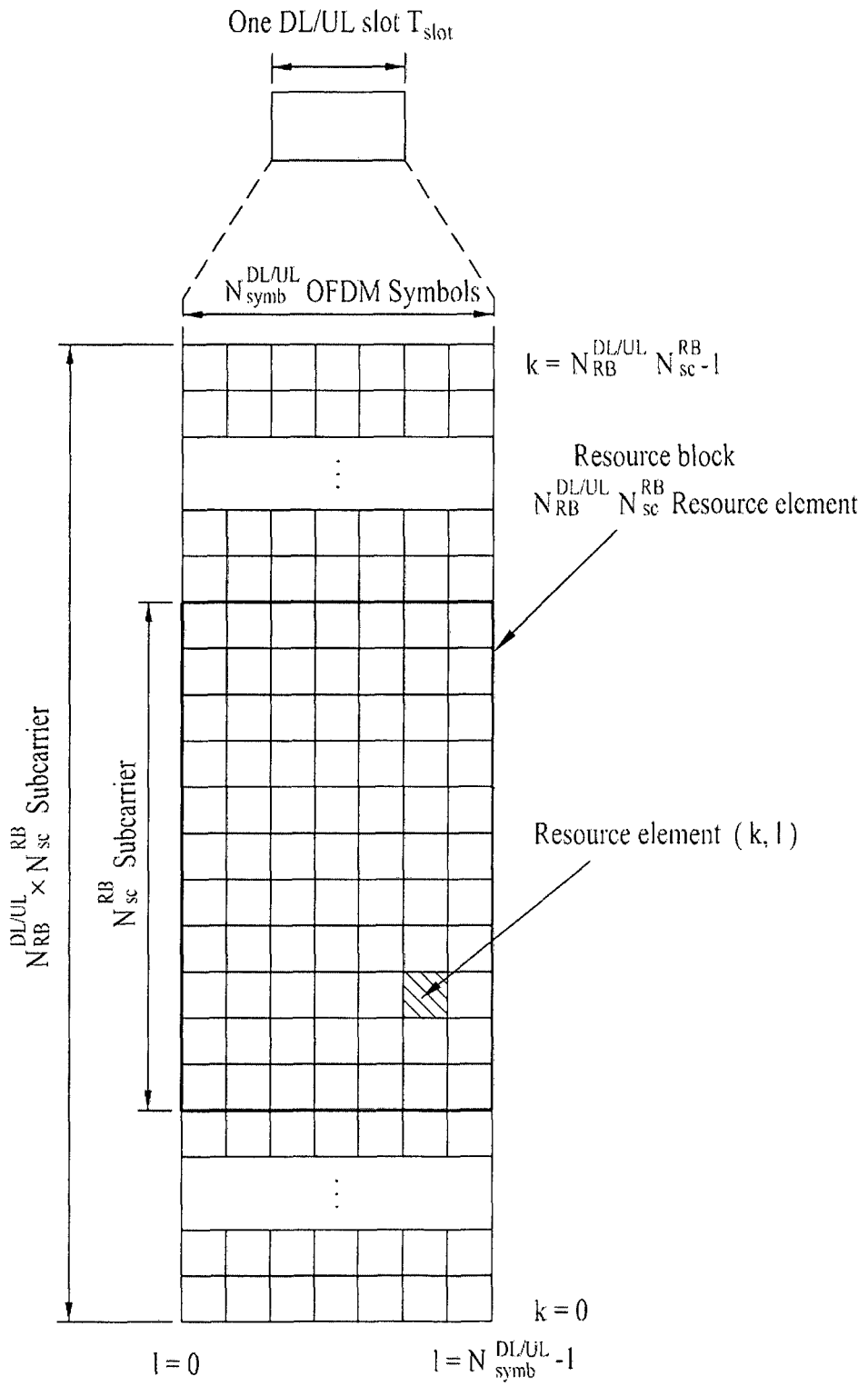
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12)

consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
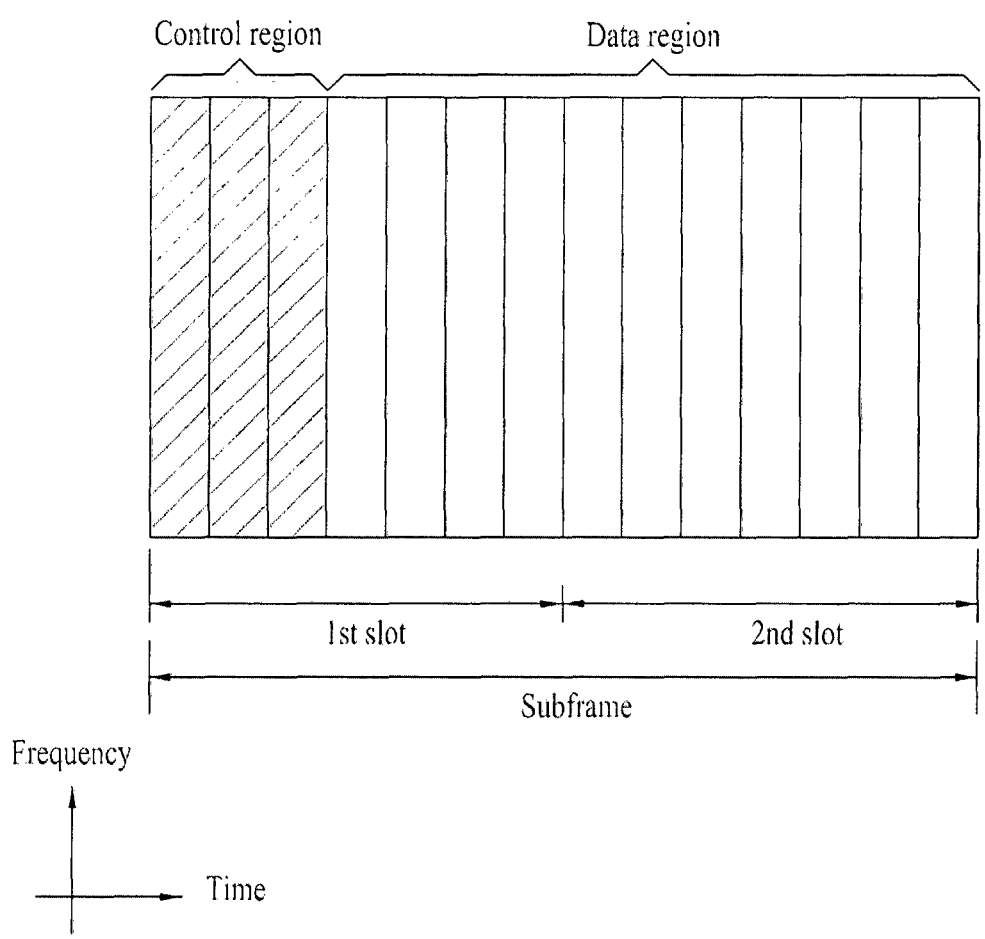
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot.

Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
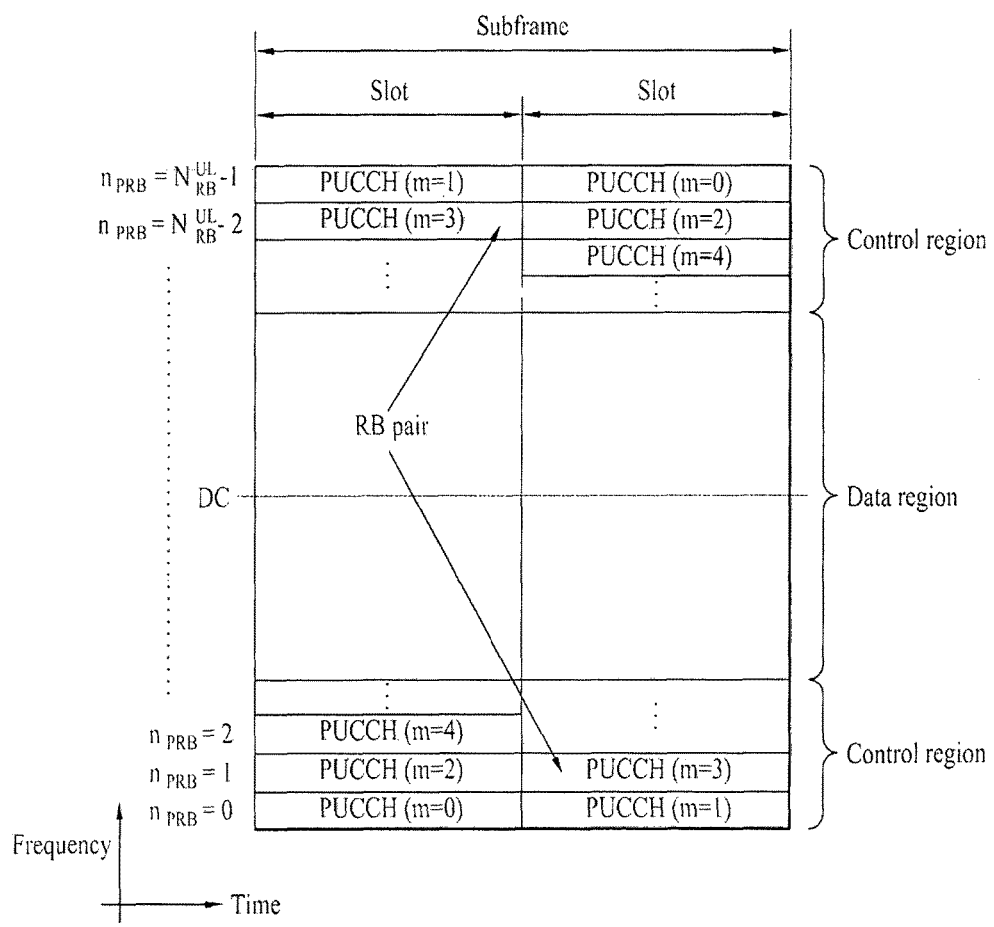
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
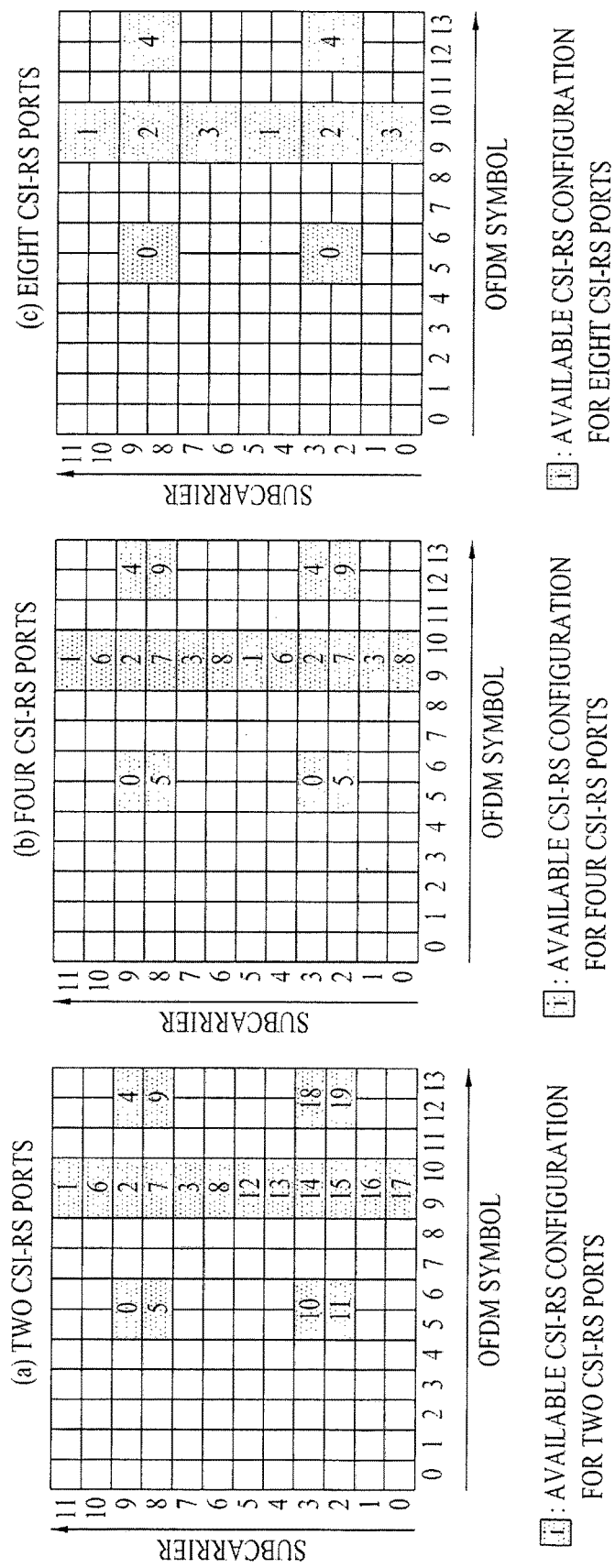
FIG. 5 is a diagram showing mapping channel state information-reference signal used in a 3GPP LTE/LTE-A system.

FIG. 5 shows a CSI-RS mapping pattern according to an antenna port. The antenna port configured to transmit CSI-RS is referred to as a CSI-RS port, and the position of a resource contained in a predetermined resource region in which CSI-RS port(s) transmit(s) the corresponding CSI-RS(s) is referred to as a CSI-RS pattern or a CSI-RS resource configuration. In addition, time-frequency resources through which CSI-RS is allocated/transmitted are referred to as CSI-RS resources. For example, a resource element (RE) used for CSI-RS transmission is referred to as CSI-RS RE. Unlike CRS in which the RE position at which CRS per antenna port is transmitted is fixed, CSI-RS has a maximum of 32 different constructions so as to reduce inter-cell interference (ICI) under a multi-cell environment including a heterogeneous network environment. Different CSI-RS constructions are made according to the number of antenna ports contained in the cell, and contiguous cells may be configured to have different structures. Unlike CRS, CSI-RS may support a maximum of 8 antenna ports (p=15, p=15,16, p=15, . . . , 18, and p=15, . . . , 22), and CSI-RS may be defined only for $\Delta f$=15 kHz. The antenna ports (p=15, . . . , 22) may correspond to CSI-RS ports (p=0, . . . , 7), respectively.

FIG. 5 exemplarily shows CSI-RS structures. Specifically, FIG. 5 shows the position of resources occupied by CSI-RS in one RB pair according to individual CSI-RS structures.

FIG. 5(a) shows 20 CSI-RS structures available for CSI-RS transmission by two CSI-RS ports. FIG. 5(b) shows 10 CSI-RS structures available by 4 CSI-RS ports, and FIG. 5(c) shows 5 CSI-RS structures available by 8 CSI-RS ports. Numbers may be assigned to respective CSI-RS structures defined by the number of CSI-RS ports.

If a base station (BS) constructs two antenna ports for CSI-RS transmission, i.e., if two CSI-RS ports are constructed, the two CSI-RS ports are configured to perform CSI-RS transmission on radio resources corresponding to one of 20 CSI-RS structures shown in FIG. 5(a). If the number of CSI-RS ports constructed for a specific is 4, the four CSI-RS ports may transmit CSI-RS on CSI-RS resources configured for the specific cell from among 10 CSI-RS structures shown in FIG. 5(b). Likewise, assuming that the number of CSI-RS ports configured for the specific cell is set to 8, the 8 CSI-RS ports may transmit CSI-RS on CSI-RS resources configured for the specific cell from among 5 CSI-RS structures shown in FIG. 5(c).

The CSI-RS structures have nested property. The nested property may indicate that a CSI-RS structure for a large number of CSI-RS ports is used as a super set of a CSI-RS structure for a small number of CSI-RS ports. Referring to FIGS. 5(b) and 5(c), REs configured to construct CSI-RS structure #0 regarding 4 CSI-RS ports are contained in resources configured to construct CSI-RS structure #0 regarding 8 CSI-RS ports.

A plurality of CSI-RSs may be used in a given cell. In the case of non-zero power CSI-RS, only CSI-RS for one structure is transmitted. In the case of zero-power CSI-RS, CSI-RS of a plurality of structures can be transmitted. From among resources corresponding to the zero-power CSI-RS, the UE proposes zero transmit (Tx) power for resources other than resources to be proposed as non-zero power CSI-RS. For example, in the case of a radio frame for TDD, no CSI-RS is transmitted in any one of a special subframe in which DL transmission and UL transmission coexist, a subframe in which a paging message is transmitted, and a subframe in which transmission of a synchronous signal, physical broadcast channel (PBCH) or system information block type1 (SIB1) collides with CSI-RS. The UE assumes that no CSI-RS is transmitted in the above subframes. Meanwhile, time-frequency resources used by the CSI-RS port for transmission of the corresponding CSI-RS are not used for PDSCH transmission, and are not used for CSI-RS transmission of other antenna ports instead of the corresponding CSI-RS port.

Time-frequency resources used for CSI-RS transmission are not used for data transmission, such that a data throughput is reduced in proportion to the increasing CSI-RS overhead. Considering this fact, CSI-RS is not constructed every subframe, and the CSI-RS is transmitted at intervals of a predetermined transmission period corresponding to a plurality of subframes. In this case, compared to the case in which CSI-RS is transmitted every subframe, the amount of CSI-RS transmission overhead can be greatly reduced. The above-mentioned subframe will hereinafter be referred to as a CSI-RS subframe configured for CSI-RS transmission.

A base station (BS) can inform a UE of the following parameters through higher layer signaling (e.g., MAC signaling, RRC signaling, etc.).

Number of CSI-RS ports

CSI-RS structure

CSI-RS subframe structure $I_{CSI-RS}$

CSI-RS subframe structure period $T_{CSI-RS}$

CSI-RS subframe offset $\Delta_{CSI-RS}$

If necessary, the BS (or eNB) may inform the UE of not only a CSI-RS structure transmitted at zero power, but also a subframe used for transmission of the zero-power CSI-RS structure.

Channel State Information-Interference Measurement (CSI-IM)

For the 3GPP LTE Rel-11 UE, one or more CSI-IM resource structures may be configured. CSI-IM resource may be used to measure interference. The CSI-RS structure and the CSI-RS subframe structure ($I_{CSI-RS}$) shown in FIG. 5 may be configured through higher layer signaling for each CSI-IM resource.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 4 below.

TABLE 4

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 6, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant) transmitted via a PDCCH signal. Table 5 below shows the mode of the UE when the CQI, the PMI and the RI are transmitted via the PUSCH.

TABLE 5

| | | PMI feedback type | | |
|---|---|---|---|---|
| | | No PMI | Single PMI | Multiple PMIs |
| PUSCH CQI feedback type | Wideband (wideband CQI) | | | Mode 1-2 |
| | UE selection (subband CQI) | Mode 2-0 | | Mode 2-2 |
| | Higher layer configuration (subband CQI) | Mode 3-0 | Mode 3-1 | |

The transmission mode of Table 5 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 6 below.

TABLE 6

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 6. Referring to Table 6, in Mode 2-0 and Mode 2-1, a bandwidth (BP) part is a set of subbands continuously located in a frequency domain and may cover a system bandwidth or a specified set S. In Table 6, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 2: A wideband CQI and a PMI (WB-CQI/PMI) are transmitted.

iii) Type 3: An RI is transmitted.

iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 6, the transmission periodicity of the wideband CQI/PMI and the subband CQI is P and has the following properties.

The wideband CQI/PMI has periodicity of H*P. At this time, H=J*K+1, wherein J denotes the number of BPs and K denotes the number of periodicities of the BP. That is, the UE performs transmission at {0, H, 2H, . . . }.

The CQI is transmitted at a time of J*K rather than when the wideband CQI/PMI is transmitted.

In Table 6, the transmission periodicity of the RI is a multiple m of that of the wideband CQI/PMI and has the following properties.

The offsets of the RI and the wideband CQI/PMI are 0 and, if the RI and the wideband CQI/PMI are transmitted in the same subframe, the wideband CQI/PMI is not transmitted.

Parameters. P, H, K and O described in Table 6 are all determined at the higher layer of the UE and signaled to a physical layer of the UE.

Hereinafter, a feedback operation according to the mode of the UE will be described with reference to Table 6. If the UE is in Mode 1-0 and the RI is transmitted to the BS, the UE generates the RI with respect to the system bandwidth or the specified set S and transmits Type 3 report for transmitting the RI to the BS. If the UE transmits the CQI, the wideband CQI is transmitted.

If the UE is in Mode 1-1 and transmits the RI, the UE generates the RI with respect to the system bandwidth or the specified set S and transmits a Type 3 report for transmitting the RI to the BS. If the UE transmits the CQI/PMI, a single precoding matrix is selected in consideration of the recently transmitted RI. That is, the UE transmits a type 2 report composed of a wideband CQI, a single precoding matrix and a differential wideband CQI to the BS.

If the UE is in Mode 2-0 and transmits the RI, the UE generates the RI with respect to the system bandwidth or the specified set S and transmits a Type 3 report for transmitting the RI to the BS. If the UE transmits the wideband CQI, the UE generates the wideband CQI and transmits a Type 4 report to the BS on the assumption of the recently transmitted RI. If the UE transmits the CQI for the selected subband, the UE selects a most preferred subband with respect to J BPs composed of N subbands and transmits a Type 1 report to the BS. The type 1 report may be transmitted via one or more subframes according to the BP.

If the UE is in Mode 2-1 and transmits the RI, the UE generates the RI with respect to the system bandwidth or the specified set S and transmits a Type 3 report for transmitting the RI to the BS. If the UE transmits the wideband CQI to the BS, the UE generates the wideband CQI and transmits a Type 4 report to the BS in consideration of the recently transmitted RI. If the CQI for the selected subbands is transmitted, the UE generates a difference between a single CQI value for the selected subbands in the BP in consideration of the recently transmitted PMI/RI and a CQI of a codeword on the assumption that a single precoding matrix is used for the selected subbands and the recently transmitted RI if the RI is greater than 1 with respect to J BPs composed of Nj subbands and transmits a Type 1 report to the BS.

In addition to estimation (CSI reporting) of the channel state between the BS and the UE, for reduction of an interference signal and demodulation of a signal transmitted between the BS and the UE, various reference signals (RSs) are transmitted between the BS and the UE. The reference signal means a predefined signal having a special waveform, which is transmitted from the BS to the UE or from the UE to the BS and is known to the BS and the UE, and is also referred to as pilot. In 3GPP LTE release 8 (hereinafter, Rel-8), a cell specific reference signal (CRS) is proposed for the purpose of channel measurement of CQI feedback and demodulation of a physical downlink shared channel (PDSCH). However, after 3GPP LTE release 10 (hereinafter, Rel-10), separately from the CRS of Rel-8, a channel state information-reference signal (CSI-RS) for CSI feedback is proposed according to Rd-10.

Each BS may transmit a CSI-RS for channel measurement to the UE via a plurality of antenna ports and each UE may calculate channel state information based on the CSI-RS and transmit the channel state information to each BS in response thereto.

Figure 6:
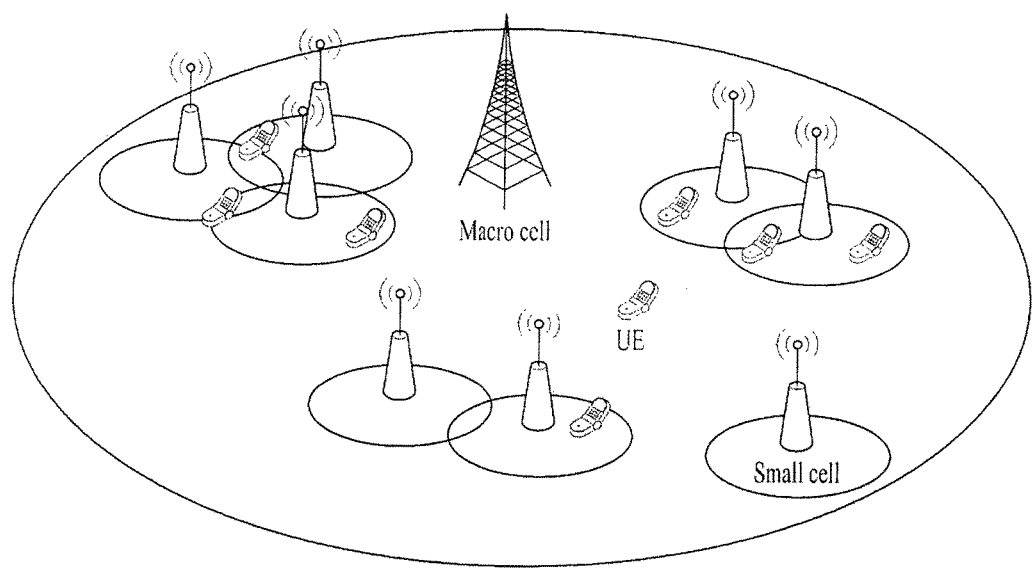
FIG. 6 is a diagram illustrating a wireless communication system according to an embodiment of the present application.

The 3GPP LTE Rel-12 system introduces small cells having a smaller coverage than the legacy macro cell into a specific region so as to support a data service for the specific region, when the number of data Tx requests of UEs present in the specific region is rapidly increased and it is difficult for the legacy macro cell to provide data of the above UEs. The small cells may be installed at random in coverage of the macro cell. If necessary, the small cells may be distributed with high density as necessary. FIG. 6 is a conceptual diagram illustrating a heterogeneous cell network composed of a macro cell and small cells.

In this case, the UE may receive serious interference from other Tx points excepting a transmission (Tx) point (e.g., a macro cell or a small cell) at which the UE receives a necessary service. The conventional 3GPP LTE system has proposed the ICIC (inter-cell interference coordination) scheme for a time domain and the ICIC scheme for a frequency domain as ICIC schemes in which influence of heterogeneous cell interference is considered. Under the environment in which small cells have low density, influence of mutual interference between the macro cell and the small cell is of importance. Under the above environment, the macro cell and the small cell use different resources in a time domain, so that the ICIC scheme for use in the time domain in which interference avoidance exists may be valid. However, under the environment in which small cells have high density, not only influence of interference between the macro cell and the small cell, but also influence of interference between small cells must be significantly considered. Under the above environment, resources having different transmission (Tx) points are utilized in the frequency domain, so that the ICIC scheme for use in the frequency domain in which interference avoidance occurs may be valid.

FIG. 7 is a conceptual diagram illustrating one example showing the ICIC scheme for use in the frequency domain according to one embodiment. In FIG. 7, a macro cell TP1 uses a total frequency band, a small cell TP2 shows that data is provided with high power at a first band, a small cell TP3 shows that data is provided with high power at a second band, and the small cells (TP2, TP3) show that data is provided with low power in the frequency domain other than the corresponding band.

In order to support the MIMO scheme in the 3GPP LTE system, the BS (or eNB) can receive CSI feedback information from the UE. For example, the BS (eNB) for use in the 3GPP LTE Rel-11 system transmits CSI-RS so as to measure CSI. The UE may receive the CSI-RS to perform channel estimation, and feeds CSI information (for example, rank indicator (RI), channel quality information (CQI), preceding matrix indicator (PMI), etc.) to the BS. The CSI feedback information calculates the set S composed of a plurality of subbands, first decides the RI, enables the UE to select an optimum CQI and PMI in response to the above RI, and transmits the optimum CQI and PMI to the BS. In this case, when deciding RI and CQI, interference must be reflected into a PDSCH region in which actual data is transmitted in such a manner that a proper MCS (modulation and coding scheme) can be applied. However, when deciding PMI, the operation for utilizing accurate channel information having minimum interference influence is of importance to the PMI decision. Considering randomness of contiguous-cell interference, RI, CQI, and PMI are generally defined for a total DL frequency band assigned to the UE. However, under the environment in which the ICIC scheme is applied to the frequency domain and frequency selective interference occurs as shown in FIG. 7, it is preferable that interference for the total band allocated to the UE is considered during calculation of RI and CQI, interference may be excluded from PMI calculation.

Therefore, when the UE feeds back the frequency resource region set S composed of a plurality of sub-bands under the environment in which frequency selective interference occurs, the resource region set S1 composed of sub-bands in which interference influence is reflected and the resource region set S2 composed of sub-bands in which interference influence is reduced are separated from each other so as to measure CSI-IM. A method for excluding sub-bands having high interference when the resource region set S2 is configured, or a method for performing frequency selective differentiation of the frequency resource unit when the resource region set S2 is configured will hereinafter be described. A method for integrating or sub-dividing feedback units of all or some sub-bands of the resource region sets S1 and S2 so as to reflect dynamic interference characteristics will hereinafter be described.

In this case, the UE may use the resource region sets S1 and S2 as a reference for the CSI calculation process, may actually perform feedback of the set S, may feed back the resource region sets S1 and S2, and may correct the resource region sets S1 and S2 in response to the set S. The present invention will hereinafter be described using the CSI feedback process for use in the LTE system as an example for convenience of description, and the operations of the present invention can be extended and applied to a wireless communication system using multiple antennas.

First Embodiment: Method for Configuring Resource Region Set for CSI Feedback

In accordance with a detailed embodiment, when the UE calculates CSI of the set S composed of the set of sub-bands in terms of frequency resources under the environment having frequency selective interference and performs feedback, the UE may independently configure the resource region S1 used when the UE measures CSI-IM and the resource region S2 used when the UE measures CSI-RS. In this case, the term "independently" means that two resource regions are not mutually exclusive each other, and two resource resources can be respectively configured. CSI feedback information of the LTE system may be composed of RI, CQI, PMI, etc. In this case, it is preferable that reflecting neighbor-cell interference to a resource region allocated to the UE be used to decide not only the number of spatial layers having a data loss rate but also the MCS level, etc. It is preferable that PMI information may reflect pure channel information to maximize a beam gain.

It is assumed that a first UE (UE 1) receives DL data transmission regarding all frequency resources from $TP_1$ and is contiguous to $TP_2$ under the environment of FIG. 7. In this case, when UE 1 receives data, UE 1 receives frequency selective interference from $TP_2$ during data reception. In this case, when UE 1 calculates CSI (such as RI, CQI, PMI, etc.) in association with frequency resources allocated to the UE 1, interference is well reflected to the RI and CQI calculation process, so that the number of spatial layers having a relatively proper level and the MCS can be decided, and a channel estimation error caused by interference may be present in the PMI calculation process. As one method for solving the above-mentioned problem, a method for excluding a region having high frequency selective interference from a resource region for CSI-RS measurement may be considered. For this purpose, the resource region S1 for CSI-IM measurement and the resource region S2 for CSI-RS measurement must be independently configured. In this case, S2 may have a smaller amount of frequency resources than the set S in which actual feedback must be performed. Here, the UE can correct channel information of the resource region not present in S2 using the channel interpolation method.

Additionally or alternatively, according to the detailed embodiment of the present invention, the UE may configure a frequency resource region (e.g., S1 and S2) for additional CSI reference according to detailed CSI content (e.g., RI/CQI, PMI). In accordance with a detailed embodiment, CSI feedback information for use in the LTE system may be composed of RI, CQI, PMI, etc. As described above, since the channel estimation error caused by the above interference exists in the PMI calculation process due to frequency selective interference, a method for excluding a specific region having excessively high frequency selective interference from the PMI calculation process may be used to solve the above channel estimation error. For this purpose, different resource regions may be configured according to types (i.e., RI, CQI, and PMI) of detailed CSI information. For example, the resource region S1 configured for RI and CQI calculation and the resource region S2 configured for PMI calculation need to be configured separately from each other. In this case, after the UE first calculates RI of either S1 or S2, the UE calculates PMI for S2, and then calculates CQI for S1. In this case, S2 may have a smaller number of frequency resource regions than S1, such that PMI information of resources not contained in S2 may be corrected by the channel interpolation method promised between the UE and the BS (eNB) so that the corrected result can be utilized for CQI calculation. In addition, the UE may correct RI, CQI, and PMI in response to the resource region set S, and feed back the corrected result. Alternatively, RI and CQI may be fed back in response to S1, and PMI may be fed back only to S2. In the above operations, the UE may have the degree of freedom in association with the scheme for measuring CSI-IM and CSI-RS. That is, the above operations may be different from S1 configuration for CSI-IM and S2 configuration for CSI-RS.

Second Embodiment—Method for Obtaining Information of the Configured Resource Region Set In accordance with a detailed embodiment, under the condition that the UE calculates CSI of the set S composed of the set of sub-bands in terms of frequency resources under the environment having frequency selective interference and performs feedback, when the UE may independently configure the resource region set S1 used when the UE measures CSI-IM and the resource region S2 used when the UE measures CSI-RS, or when the frequency resource region (e.g., Set S1, Set S2) for an additional CSI reference is configured according to a detailed CSI content (e.g., RI/CQI, PMI), some frequency resource regions may be excluded from the resource region set S so as to configure S1 and S2 in accordance with the first embodiment, and the UE may be notified of information (or S1 and/or S2 information) regarding the excluded frequency resources. In the LTE system, when the CSI-RS based channel is estimated or the PMI is calculated in the LTE system as described above, it is preferable that channel information from which interference is maximally reduced be reflected. In this case, when the BS (or eNB) decides the occurrence of serious contiguous cell interference influence in a specific frequency resource region in advance according to the operation of the present invention, the sub-bands for the corresponding frequency resources or frequency resource regions are excluded from the above set S, such that the excluded result may be configured as the frequency resource region S2 for CSI-RS measurement. In this case, it is assumed that the above interference influence is relatively semi-statically changed, and the BS (or eNB) may inform the UE of bitmap information of the excluded sub-bands or excluded frequency resource regions through higher layer signaling such as RRC signaling. Here, since there is high contiguous cell interference in S2 information (i.e., sub-bands contained in the set S or the frequency resource regions), the sub-bands or the frequency resource regions are excluded. In the above operation, the UE may feed back the set S, or may feed back S1 and S2. In the latter case, the frequency resource region of S1 may be different from the frequency resource region S2. In this case, S2 must be used as a subset of the frequency resource region S1, and the frequency resource region S1 must be fed back. In this case, when channel information of the sub-band that is not contained in S2 whereas it is contained in S1 may be corrected through channel interpolation on the basis of channel information contained in other sub-bands of S2.

In accordance with the first embodiment, some frequency resource regions are excluded from the resource region set S so that S1 and S2 are configured. In accordance with another embodiment, the UE may measure interference from a contiguous cell and obtain frequency selective interference information. Some frequency resource regions (subbands) are excluded from the resource region set S serving as a feedback target, so that S1 and S2 can be configured. After that, for power management of small cells in the 3GPP LTE Rel-12 system, activation/deactivation of transmission/reception of a small-cell BS (small-cell eNB) may be considered.

The activation/deactivation operation may be similar to SCell (Secondary Cell) activation/deactivation operations based on MAC CE (Control Entity) supported by carrier aggregation (CA) for use in 3GPP LTE Rel-11. Under the above environment, it may be difficult for the BS (eNB) to pre-recognize frequency selective interference information capable of being dynamically changed, such that the UE recognizes frequency selective interference information by directly measuring interference, excludes the frequency resource region having high interference from the total frequency band for CSI reporting on the basis of the corresponding information so as to configure S1 and S2, and can inform the BS (eNB) of information regarding the excluded frequency resources. For example, if the BS (eNB) informs the UE of a threshold value indicating the presence of frequency selective interference through higher layer signaling such as RRC signaling, the UE measures contiguous cell interference related to a DL frequency band allocated to the UE itself through CSI-IM for interference measurement proposed by 3GPP LTE Rel-11, and a sub-band in which the interference amount higher than the above threshold value is excluded from the set S so that the frequency resource region S2 for channel measurement based on CSI-RS may be configured. In this case, the actually feedback resource region may be subject to the set S, and the BS (eNB) may correct channel information of the sub-band having no channel measurement using the channel interpolation method, because the sub-band channel information is not contained in the frequency resource region S2. Accordingly, in the above process, the BS (eNB) is operable without receiving feedback of additional information of S1 and S2 from the UE.

Third Embodiment—Method for Integrating/Subdividing Basic Unit of Resource Region Set Additionally or alternatively, the base station (BS) according to the embodiment previously obtains frequency selective interference information, adjusts the size of sub-bands of S1 and S2 in some frequency resource regions in consideration of the interference, and may inform the UE of the corresponding information. In the LTE system, it is preferable that channel information from which interference is maximally removed is used when the UE determines PMI. In accordance with one method for mitigating frequency domain interference of the CSI feedback process, if frequency selective characteristics of the channel are not high, the size of the sub-band is configured to be lager such that a mean value of channel values estimated on the basis of much more CSI-RS resources in the configured sub-band may be used as necessary. When the channel value is obtained by averaging sample values of the channel obtained in the CSI-RS resources in the sub-band, noises having random characteristics are removed during averaging process. The larger number of sample values, the better effect of noise removing or mitigating. For example, it is assumed that the set S is composed of the same-sized sub-bands. In this case, assuming that the BS (eNB) obtains information regarding frequency selective contiguous cell interference in advance, a new sub-band larger in size than the sub-band constructing the legacy set S may be configured for the frequency resource region having the above interference. In more detail, two sub-bands defined in the legacy set S in the frequency resource region having interference may be set to one subband for the set S2. In this case, the BS (eNB) may indicate which subband of the set S is unified using a bitmap format through higher layer signaling such as RRC signaling. Assuming that 9 sub-bands are allocated to the set S of the UE and respective sub-bands are defined as subbands (#0, #1, . . . , #8), sub-bands #2 and #3 are integrated to mitigate frequency selective interference, and information indicating integration of sub-bands #4 and #5 may be indicated through the following bitmap [0 1 0 0 1 1 0 1 0]. In this case, assuming that the same bit value is assigned to contiguous sub-bands, it can be appreciated that contiguous sub-bands having the same value may be integrated into one sub-band.

Additionally or alternatively, in order to reflect contiguous cell interference characteristics changing with a smaller frequency unit according to a detailed embodiment, the BS may inform the UE of a specific signal for selectively sub-dividing a sub-band size in association with some sub-bands from among sub-bands contained in S1, S2 or S. Even when frequency selective interference is present, interference may be changed in units of a very small frequency in response to the precoding scheme or specific information indicating whether or not data of the actual contiguous cell is transmitted. In the above case, feedback needs to be sub-divided more and more. However, if the frequency selective interference frequently occurs in some of all bands allocated to the UE as shown in FIG. 7, a total feedback unit need not be sub-divided, and a feedback unit only for the some bands may be sub-divided. Therefore, the BS (eNB) may sub-divide some sub-bands having serious frequency selective interference from among all sub-bands contained in S1, S2, or S (for example, sub-band sub-division is performed only for sub-bands in which the frequency selective interference is higher than a threshold value), and the UE may be notified of the corresponding information. For example, under the condition that 9 sub-bands are allocated to S1, S2, or S by the UE, and individual sub-bands are defined as sub-bands (0, 1, . . . , 8), if a feedback unit desires to be sub-divided at sub-bands (2, 3, 4, 5), information of sub-bands sub-divided through the bitmap may be notified through [0 0 1 1 1 1 0 0 0], and the degree of additional sub-division may be denoted by ceiling[log 2(N)] bits indicating one of the above values pre-defined as N definite values.

Additionally or alternatively, in order to reflect contiguous cell interference characteristics changing with a smaller frequency unit according to a detailed embodiment, the LIE may selectively sub-divide some sub-bands from among sub-bands contained in S1, S2 or S, and may then feed back CSI for the sub-divided sub-bands to the UE. Even when frequency selective interference is present, interference may be changed in units of a very small frequency in response to the precoding scheme or specific information indicating whether or not data of the actual contiguous cell is transmitted. In the above case, feedback needs to be sub-divided more and more. However, if the frequency selective interference frequently occurs in some of all bands allocated to the UE as shown in FIG. 7, it is preferred that a total feedback unit need not be sub-divided, and a feedback unit only for the some bands may be sub-divided. Therefore, the BS (eNB) may sub-divide some sub-bands having serious frequency selective interference from among all sub-bands contained in S1, S2, or S, and CSIs for the sub-divided sub-bands may be fed back to, the BS (eNB). In this case, the BS (eNB) must previously inform the UE of the sub-division unit of the sub-band (e.g., ½ (one sub-band is divided into two parts)) and the number of sub-bands to be selected through higher layer signaling such as RRC signaling.

Additionally or alternatively, when the UE measures frequency selective interference according to a second embodiment, the above-mentioned sub-band integration/sub-division associated information may be decided or obtained by the UE. In this case, the sub-band integration/sub-division associated information may be reported to the BS (eNB).

Figure 8:
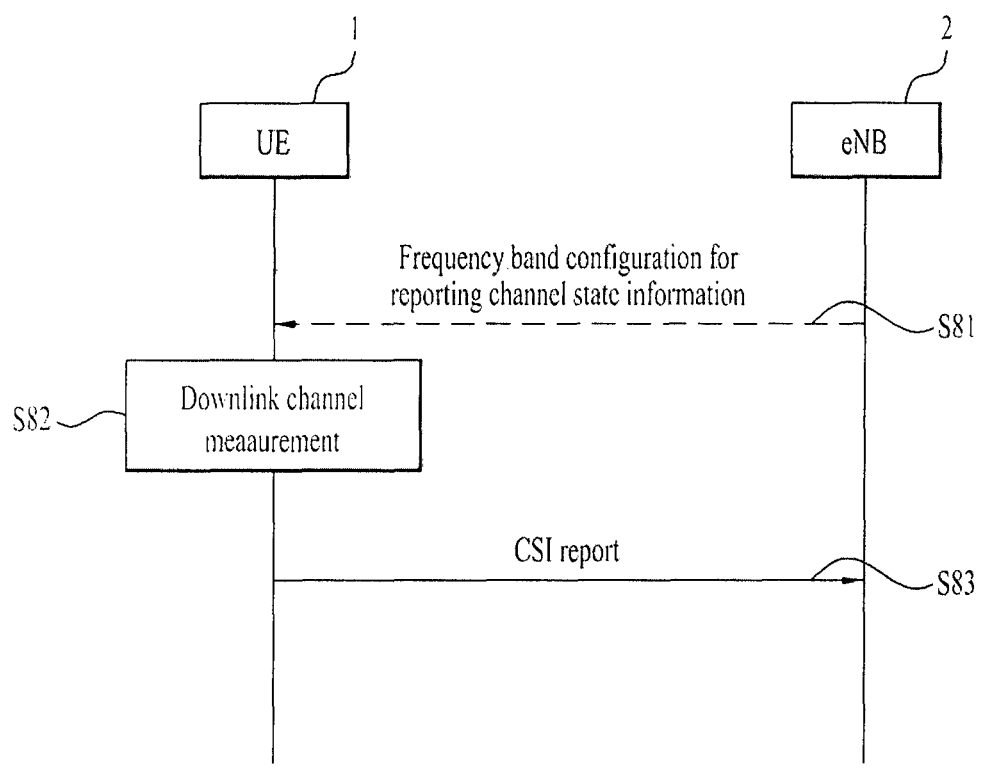
FIG. 8 is a diagram showing a procedure of an embodiment of the present invention.

FIG. 8 is a diagram showing a procedure of an embodiment of the present invention. Referring to FIG. 8, as can be seen from a dotted line indicating an option, the UE may receive configuration information regarding a frequency band for reporting channel state information (CSI) from the BS in step S81. The above configuration information may be directly decided by the UE, and may be decided with reference to the above-mentioned embodiment(s). The frequency band may be independently configured for each information (i.e., RI, PMI, CQI) of the CSI. In the case where frequency selective inter-cell interference (ICI) is present, specific information indicating whether the inter-cell interference (ICI) is included when the corresponding information is calculated in response to each information may be desirable or undesirable, such that a frequency band in which each information will be measured (or calculated) is configured for each information.

The UE may measure a channel in response to configuration regarding the frequency band in step S82. For example, assuming that the sub frequency band 1 is configured for RI/CQI and the sub frequency band 2 is configured for PMI, RI/CQI can be measured (calculated) at the sub frequency band 1, and PMI can be measured (calculated) at the sub frequency band 2. More detailed configuration/operations may refer to the above-mentioned embodiments, as such a detailed description thereof will herein be omitted for convenience of description.

The UE may report the measurement result to the BS in step S83. The measurement result may be reported for a total frequency band, or may also be reported for the sub frequency band 1 and the sub frequency band 2. In the former case, information regarding the frequency band excluded from each sub frequency band may be obtained through the interpolation method defined on the basis of the result measured by the UE. In the latter case, the BS (eNB) having received the above report can obtain information regarding the frequency band excluded from each sub frequency band through the interpolation method predefined on the basis of the above report.

FIG. 8 shows only some parts of the above-mentioned embodiment(s), and it should be noted that some contents of the first to third embodiments may be applied to FIG. 8.

Figure 9:
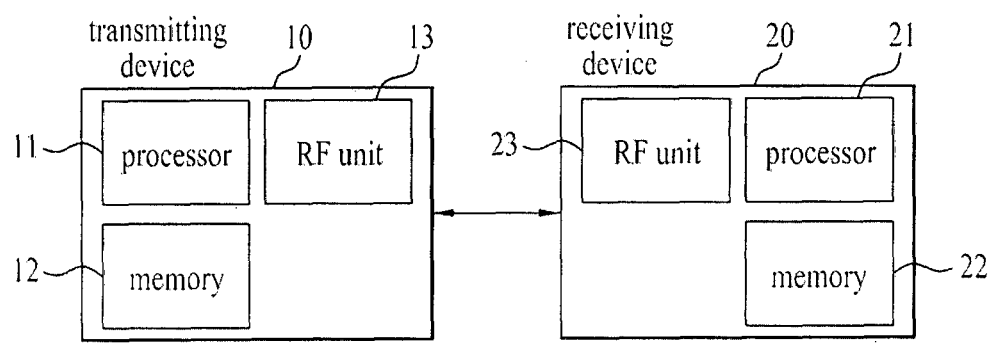
FIG. 9 is a block diagram of an apparatus for implementing embodiment(s) of the present invention.

FIG. 9 is a block diagram of a transmitting device 10 and a receiving device 20 configured to implement exemplary embodiments of the present invention. Referring to FIG. 9, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used for wireless communication systems such as a UE, a relay, an eNB, etc.

The invention claimed is:

1. A method for reporting channel state to a base station (BS) by a user equipment (UE) in a wireless communication system having frequency-selective inter-cell interference, comprising:
    performing channel measurement in a frequency band configured for downlink channel measurement; and
    reporting downlink channel state information (CSI) in accordance with the downlink channel measurement,
    wherein the frequency band is independently configured for each information contained in the CSI, and the channel measurement is performed in each information-specifically configured frequency band, and
    wherein the channel measurement is performed on a sub-band basis, at least one sub-band is sub-divided into at least two sub-bands within the frequency band, and specific information indicating the sub-band to be sub-divided and the number of sub-divisions of the indicated sub-band is indicated by bitmap information.

2. The method according to claim 1, wherein the frequency band is set to a frequency band (hereinafter referred to as a first frequency band) for first information/second information of the CSI, and is set to a frequency band (hereinafter referred to as a second frequency band) for third information of the CSI, wherein the second frequency band is a subset of the first frequency band.

3. The method according to claim 2, wherein the second frequency band excludes a frequency band in which the amount of interference is equal to or higher than a threshold value from the first frequency band.

4. The method according to claim 2, wherein the first information is a rank indicator (RI), the second information is a channel quality indicator (CQI), and the third information is a precoding matrix indicator (PMI).

5. The method according to claim 1, wherein the configuration of the frequency band is signaled from the base station (BS), or is directly decided by the user equipment (UE).

6. The method according to claim 1, wherein, each information contained in the CSI for a frequency band from which each information-specifically configured frequency band contained in the CSI is excluded from among the frequency band, is obtained by a pre-configured channel interpolation method.

7. The method according to claim 1, wherein the channel measurement is performed on a sub-band basis, at least two sub-bands are integrated into one sub-band within the frequency band, and the integrated sub-band is indicated by bitmap information.

8. The method according to claim 1, wherein the sub-division of the sub-band is performed only for sub-band(s) in which a frequency selective inter-cell interference amount is higher than a threshold value.

9. A user equipment (UE) for reporting a channel state to a base station (BS) in a wireless communication system including frequency-selective inter-cell interference, comprising:
  a radio frequency (RF) unit; and
  a processor configured to control the RF unit,
  wherein the processor performs channel measurement in a frequency band configured for downlink channel measurement, and reports downlink channel state information (CSI) in accordance with the downlink channel measurement,
  wherein the frequency band is independently configured for each information contained in the CSI, and the processor is configured to perform the channel measurement in each information-specifically configured frequency band, and
  wherein the channel measurement is performed on a sub-band basis, at least one sub-band is sub-divided into at least two sub-bands within the frequency band, and specific information indicating the sub-band to be sub-divided and the number of sub-divisions of the indicated sub-band is indicated by bitmap information.

* * * * *